Nov. 15, 1949     C. L. DENAULT     2,488,383

CIRCUIT CONTROLLING APPARATUS

Filed Dec. 15, 1945     3 Sheets-Sheet 1

WITNESSES:

INVENTOR
Clinton L. Denault.
BY
Franklin E. Hardy
ATTORNEY

Nov. 15, 1949   C. L. DENAULT   2,488,383
CIRCUIT CONTROLLING APPARATUS
Filed Dec. 15, 1945   3 Sheets-Sheet 2
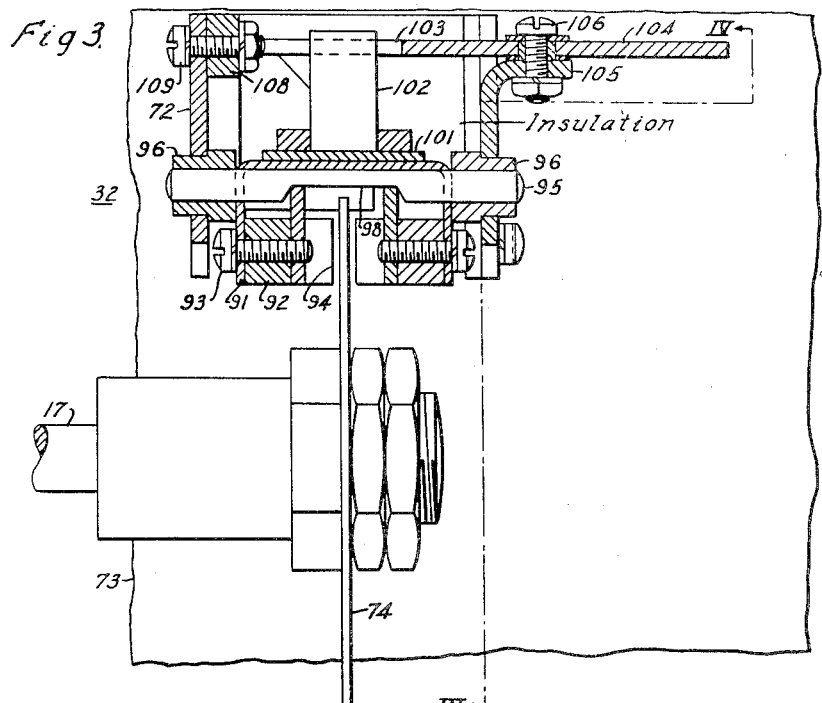
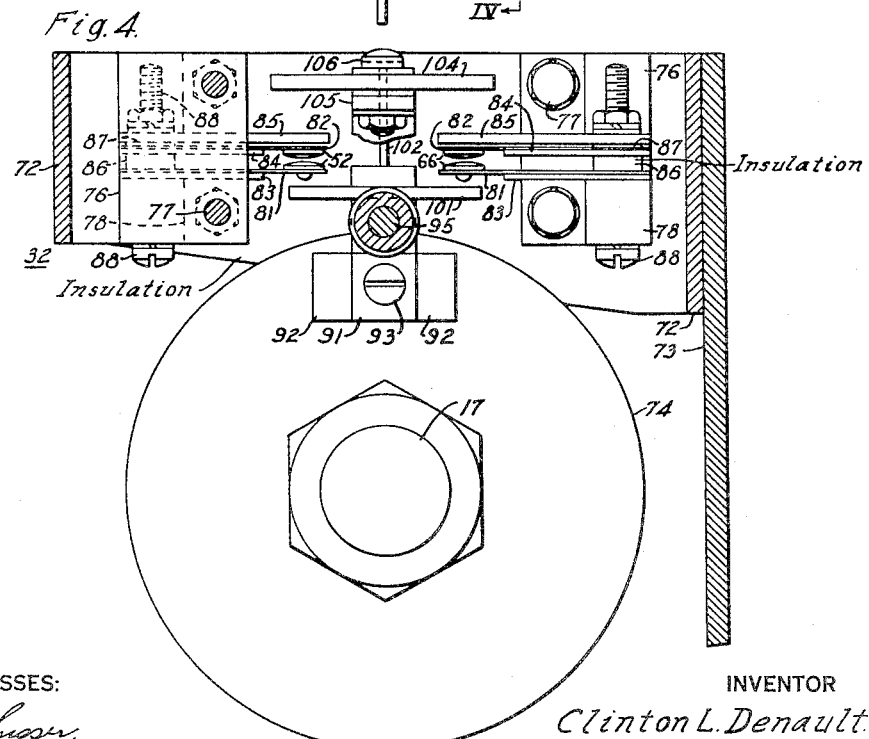
WITNESSES:
INVENTOR
Clinton L. Denault
BY
Franklin E. Hardy
ATTORNEY Nov. 15, 1949   C. L. DENAULT   2,488,383
CIRCUIT CONTROLLING APPARATUS
Filed Dec. 15, 1945   3 Sheets-Sheet 3
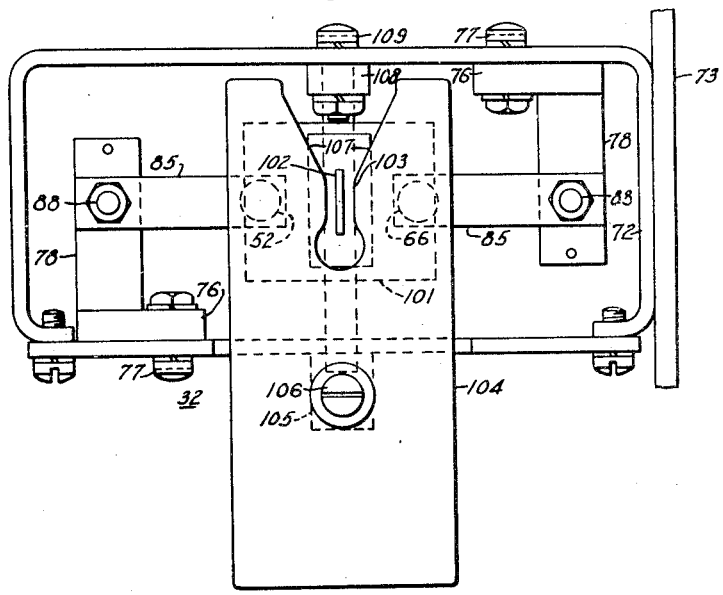
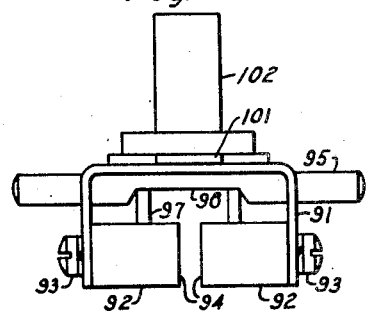
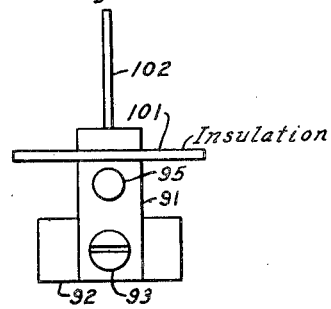
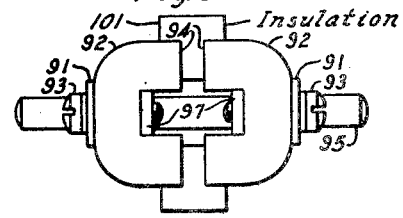
WITNESSES:
INVENTOR
Clinton L. Denault.
BY
Franklin E. Hardy
ATTORNEY Patented Nov. 15, 1949

2,488,383

UNITED STATES PATENT OFFICE 2,488,383

CIRCUIT CONTROLLING APPARATUS

Clinton L. Denault, Sharpsville, Pa., assignor to Westinghouse Electric Corporation, East Pittsburgh, Pa., a corporation of Pennsylvania Application December 15, 1945, Serial No. 635,373

7 Claims. (Cl. 318—374)

1

This invention relates to electrical apparatus, and particularly to circuit controlling apparatus for effecting the sudden stopping of an electric motor upon interruption of the circuit supplying the energizing current for operating the motor.

In many types of apparatus, such as tap changing voltage regulators, electrical mechanism is operated by a motor that is required to operate at a high speed followed by a rapid deceleration of the motor speed to rest within a limited number of revolutions of the motor upon interruption of the motor circuit. In certain types of such electrical apparatus, it has been customary to provide a braking mechanism of the friction type for stopping the motor and the operating mechanism associated therewith promptly upon the interruption of the motor driving circuit. Such braking mechanism is usually provided with biasing means for normally maintaining the brake applied when the motor is de-energized and with electrically energized releasing means that is operated upon the energization of the motor to release the brakes when the motor operating circuit is energized.

It is well known that a motor may be braked dynamically by reversing the connection of its leads to the power source to effect the supply of energy to the motor from the source in a direction to create a motor torque in the reverse direction to its direction of rotation. This operation is commonly termed "plugging" the motor. Certain difficulties occur in plugging the motor of the size customarily employed in voltage regulators or similiar equipment because the inertia of the moving parts is so small that the duration of time during which the reverse direction of power is required to be applied to the motor to bring it to a complete stop without reversing the direction of operation of the motor is very short.

It is an object of my invention to provide means for stopping a motor by supplying power thereto in a direction to reverse the motor torque and for interrupting the current supplied to effect such a reverse motor torque upon the stopping of the motor.

More specifically, it is an object of the invention to provide a directional switch device employing an eddy current disk that is adapted for use in circuit controlling apparatus of the above-indicated character.

Other objects and advantages of my invention will be apparent from the following description of a preferred embodiment thereof, reference being had to the accompanying drawings in which:

2

Fig. 3 is a sectional view of the directional switch device taken along the line III—III in Fig. 2.

Fig. 4 is a sectional view of the directional switch device taken along the line IV—IV of Fig. 3.

Fig. 5 is a top plan view of the switch supporting frame together with parts attached thereto.

Figs. 6, 7 and 8 are a side elevational view, an end view, and a bottom view, respectively, of a switch operating structure or magnet assembly pivotally attached to the switch supporting frame.

Figure 1:
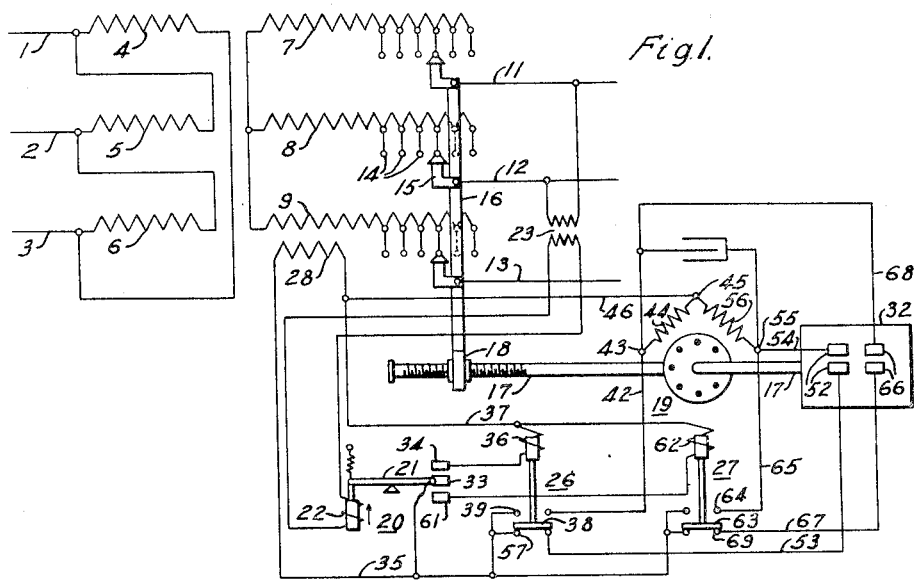
Figure 1 is a diagrammatic view of apparatus and circuits illustrating an application of the invention to a tap changing regulating transformer.
Figure 2:
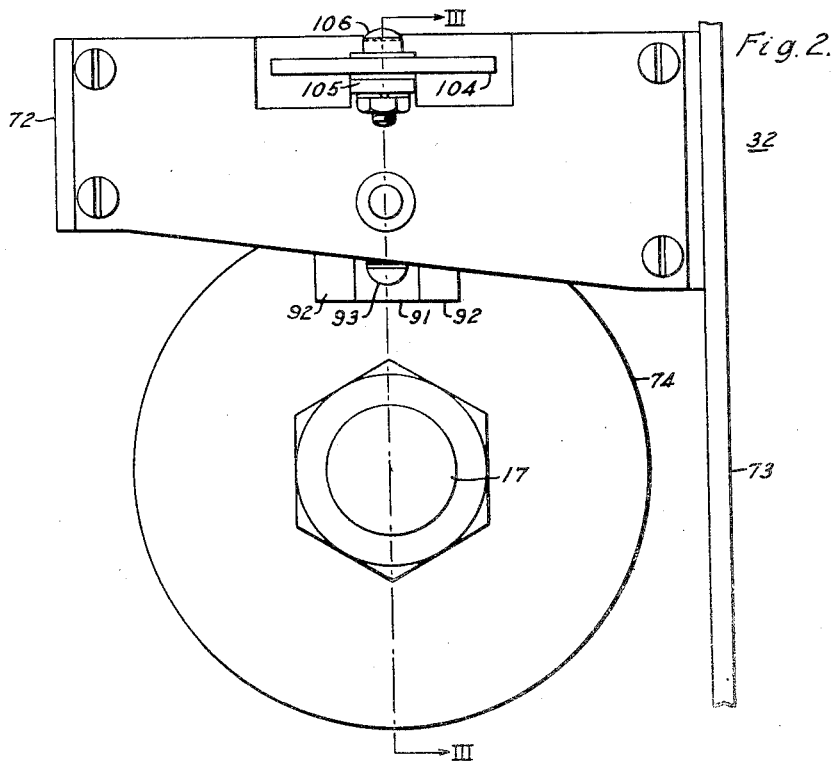
Fig. 2 is an elevational view of a directional switch device comprising a preferred embodiment of the invention.

Referring to the drawings, and more particularly to Fig. 1 thereof, conductors 1, 2 and 3 represent a three-phase alternating-current power circuit connected to primary transformer windings 4, 5 and 6 that are inductively related to secondary windings 7, 8 and 9, respectively, through which energy is supplied to the three-phase circuit represented by secondary conductors 11, 12 and 13. A tap changing mechanism is provided for varying the voltage ratio between the primary circuit conductors 1, 2 and 3 and the secondary circuit conductors 11, 12 and 13 which is diagrammatically illustrated as comprising a plurality of tap changing switch contact members 14 connected to tapped points in the secondary windings 7, 8 and 9 and co-operating with movable switch contact members 15 in each of the three phases that are similarly operated by a mechanism illustrated as an arm 16 controlled by a screw-threaded shaft 17 through suitable operating mechanism 18, which shaft 17 is operated by a motor 19.

Control equipment for the tap changing mechanism to provided comprising a circuit controller or primary relay 20 having a pivoted arm 21 and an armature controlled by an operating winding 22 that is connected to be energized from a transformer winding 23 that is connected to be energized from conductors 11 and 12 as a measure of the quantity to be regulated. The primary relay 20 controls the secondary relays 26 and 27 to supply power from the transformer winding 28 to the motor 19 to effect operation of the motor in the one or the other direction to maintain the desired voltage on the power circuit conductors 11, 12 and 13. A directional switch device 32 which may be termed a "preset motor plugging switch"

is provided and is operated in accordance with the rotation of the motor shaft 17.

If the voltage of the secondary circuit drops below the desired value, the energization of the primary relay winding 22 is decreased, permitting the armature to drop and the movable contact member 33 to engage the contact member 34 to complete a circuit from the transformer winding 28 through conductor 35, contact members 33 and 34, the winding 36 of the relay 26 and conductor 37 to the transformer winding 28. The relay 26 is thus energized, causing the relay contact member 38 to move upwardly and close a circuit from the transformer 28, through conductor 35, through relay contact members 38 and 39, conductor 42 to the motor terminal 43, through the motor phase winding 44 to the motor terminal 45, and by conductor 46 back to the transformer 28, thus causing the motor 19 to operate in a direction to effect an operation of the tap-changing mechanism to cause an increase in the voltage on the secondary conductors 11, 12 and 13. Upon operation of the motor 19, as above described, switch contact members 52 of the directional switch device 32 are brought into engagement in a manner to be later explained, closing a preset circuit including conductor 53, conductor 54, motor terminal 55, motor phase winding 56, motor terminal 45 and conductor 46 to the transformer 28. This preset circuit will be completed upon the de-energization of the motor relay 26, causing the relay contact member 38 to drop to its illustrated position engaging contact members 57. This completed preset circuit or motor plugging circuit supplies energy to the motor 19, causing it to develop a torque counter to its direction of rotation, thus rapidly bringing the motor 19 to a stop.

Upon the stopping of the motor 19, the switch contact members 52 are operated to interrupt the preset or "plugging" circuit so as to prevent operation of the motor in the reverse direction. The operation of the directional switch device 32 to effect the separation of the contact members 52 will be later described.

If the voltage of the secondary circuit, comprising conductors 11, 12 and 13, increases above the desired value, the voltage relay 20 operates, causing the contact member 33 to engage the contact member 61 thus closing a circuit through the winding 62 of the secondary relay 27, causing the relay contact member 63 to move upwardly and engage the contact members 64 closing a circuit from the transformer winding 28 through conductor 35, relay contact members 63 and 64, conductor 65 to the motor terminal 55, through the motor winding 56 to the terminal 45 and conductor 46 back to the transformer 28 to cause the motor 19 to operate in a direction to operate the tap changing mechanism to decrease the voltage of the secondary circuit represented by conductors 11, 12 and 13. When the motor 19 is thus operated to increase the secondary circuit voltage, switch contact members 66 of the directional switch device 32 are operated into circuit closing relation to close a preset motor plugging circuit that will be completed when the secondary relay 27 is de-energized, thus bringing the relay contact member 63 to its illustrated position in engagement with the relay contact members 69. This motor plugging circuit extends from the transformer 28 through conductor 35, relay contact members 63 and 69, conductor 67, switch contact member 66, conductor 68, the motor terminal 43, motor winding 44, motor terminal 45 and conductor 46 to the transformer 28.

When the voltage on the secondary circuit conductors 11, 12 and 13 reaches the desired value, the relay 20 will operate to separate contact members 33 and 61, de-energizing the secondary relay 27 and causing the relay contact member 63 to drop to its lower or illustrated position interrupting the motor energizing circuit and completing the above-traced, motor-plugging circuit through the secondary relay contact members 69 and the directional switch contact member 66, thus applying a torque to the motor 19 in a direction reverse to its direction of rotation, bringing the motor to a quick stop. When the motor is brought to a stop, the directional switch device contact members 66 are separated, thus placing the mechanism in condition for further operation in either direction in accordance with variations in the secondary voltage from the desired value as impressed upon the winding 22 controlling the operation of the primary relay 20.

Referring to Figs. 2, 3, 4 and 5, the directional switch device 32 comprises a switch supporting frame 72 attached to a mounting plate or panel 73. The control shaft 17, that is operated in accordance with the direction and speed of rotation of the motor 19, carries a torque disc 74 which may be of a suitable electrical conducting material, such as copper or aluminum. Two switch assemblies including the two pairs of switch members 52 and 66, respectively, are mounted on the switch supporting frame 72 and are generally similar in construction. Each switch assembly includes an insulating bracket 76 attached by a suitable means, such as bolts 77, to the frame 72 and having outwardly extending arms 78 carrying leaf springs 81 and 82 together with supporting members 83, 84 and 85 which are spaced by suitable insulating washers 86 and 87 and held together by a bolt 88. The pair of contact members 52 is supported on one switch assembly and the pair of contact members 66 on the other switch assembly in the relative positions shown in Figs. 4 and 5 and are normally in open circuit position.

A switch operating structure or magnet structure assembly, best shown in Figs. 3, 6, 7 and 8, is provided for operating the two pairs of switch contact members 52 and 66, and is pivotally supported across the center of the frame 72. The switch operating structure comprises a U-shaped supporting frame 91 having two downwardly extending ends carrying two U-shaped permanent magnets 92 attached to the frame by means of screws 93. The pole faces 94 of the magnets 92 are spaced apart and positioned on opposite sides of the torque disk 74 as best shown in Figs. 3 and 5. A pivot pin 95 extends through the upper part of the U frame 91 and terminates in bushings 96 in the switch supporting frame 72, thus supporting the magnet assembly above the torque disk 74 with the axis of the pivot 95 extending parallel to the axis of the shaft 17. The underside of the pivot pin 95 is cut away at 98 as best shown in Figs. 3 and 6 to better accommodate the torque disk 84 and to provide for centering the pin 95 with respect to the magnet assembly by the members 97 which engage the edges of the cutaway portion 98 at their upper end and are held in place by the screws 93.

A switch contact operating arm 101 is provided as a part of the magnet assembly, and as best illustrated in Fig. 4, is so positioned as to effect engagement of the pairs of switch contact members 52 and 66 upon movement of the magnet assembly about the pivot 95. The contact operating arm 101 may be formed of insulating material in whole or in part, so as not to interfere with the proper operation of the circuits controlled thereby. An inertia stop arm 102 is illustrated extending upwardly from the magnet assembly and is positioned within a slot 103 in an inertia stop member 104 that is pivotally mounted on a bracket 105 forming a part of the switch supporting frame 72 and through which a bolt 106 is positioned. The outer edges forming the slot 103 in the inertia stop member 104 are flared outwardly as shown at 107 and positioned on the opposite sides of a stop 108 mounted by a bolt 109 in the side of the frame 72 to limit the movement of the inertia stop member 104.

Upon operation of the motor 19 in the one or the other direction, the torque disk 74 is correspondingly operated. The rotation of the disk 74 in the air gap between the two U-shaped magnets 92 generates eddy currents in the disk which, in turn, develop a magnet flux co-operating with the U-shaped magnets to rotate the magnet assembly or switch operating structure about the pivot 95 in the one or the other direction from a neutral position depending upon the direction of rotation of the torque disk 74, thus causing the switch contact operating arm 101 to close one of the two pairs of contact members 52 or 66, as described above, with respect to Fig. 1. At the same time, the inertia stop arm 102 moves about its pivot 95 to one side of the slot 103 in the inertia stop 104. The inertia stop 104 is in a position such that, as the torque disk 74 ceases to rotate upon the stopping of the motor 19, and the magnet assembly drops back to its illustrated position, the inertia stop arm 102 will engage the appropriate side of the slot 103 to prevent overtravel of the magnet assembly in a direction to close the other one of the two pairs of contact members 52 or 66, thus preventing an unintended operation of either pair of contact members upon the stopping of the motor. The stop 108 is so positioned that, as the magnet assembly drops to its neutral position, and the rotating energy of the assembly is absorbed by the inertia stop, the inertia stop is prevented from moving beyond a point determined by the stop 108.

The return of the magnet assembly to its illustrated or neutral position is effected upon the stopping of the disk 74 and is aided in part by gravity due to the location of the magnet assembly, and in part by the spring action of the leaf springs 81 upon which the lower contact member in each pair 52 or 66 is mounted. Additional means, such as additional centering springs, may be provided for positively returning the magnet assembly to its neutral or illustrated position. Auxiliary centering springs may be used where it is desired to vary the "dropout" point of the motor, that is, the motor speed at which the present motor circuit effective for dynamic braking the motor is interrupted.

As the motor speed approaches zero during the deceleration of the motor, the magnetic pull between the torque disk 74 and the magnet assembly decreases until a point is reached where the contact members 52 or 66 separate, disconnecting the plugging circuit. When the torque disk 74 is at rest, the magnet assembly comprising the switch operating mechanism is in its neutral position and both pairs of contact members 52 and 66 are separated. By a proper design of the unbalanced mass of the magnet assembly and the adjustment of the centering springs, the opening of the plugging circuit can be controlled so that the motor comes to a dead stop or has a small residual motion in either the forward or reversing direction upon interruption of the plugging circuit.

It will be obvious to one skilled in the art that many modifications in the details of construction illustrated and described may be made within the spirit of the invention, and I do not wish to be limited otherwise than by the scope of the appended claims.

I claim as my invention:

1. In a motor driven electrical apparatus, in combination, a motor, a pair of directional relays for controlling the operation of the motor in the one or the other direction of rotation, a preset motor plugging switch device comprising a vertically positioned disk of electrically conducting material operably connected to rotate in the one or in the other direction in accordance with the rotation of said motor, a magnet structure assembly pivotally mounted above the disk upon a pivot positioned parallel to the axis of rotation of the disk for movement in the one or in the other direction from a neutral position and having magnetic poles positioned below the pivot on opposite sides of the disk for movement by magnetic attraction in accordance with the direction of rotation of the disk, said preset motor plugging switch device including two switches responsive to the movement of the magnet structure assembly in the one or in the other direction from the neutral position for closing the one or the other of said two switches, and means responsive to the movement of a directional relay to a motor interrupting position to complete the plugging circuit, said preset switch device being effective upon the stopping of the motor to interrupt said plugging circuit, and inertia means for limiting the movement of the magnet structure to prevent overtravel of the magnet structure upon its return to the neutral position upon the stopping of the rotation of the disk.

2. In a motor driven electrical apparatus, in combination, a motor, a pair of directional relays for controlling the operation of the motor in the one or the other direction of rotation, a preset motor plugging switch device comprising a disk of electrically conducting material operably connected to rotate in the one or the other direction in accordance with the rotation of said motor, a magnet structure assembly mounted for movement in the one or in the other direction from a neutral position and having magnetic poles on opposite sides of the disk for movement by magnetic attraction in accordance with the direction of rotation of the disk, said preset motor plugging switch device including two switches responsive to the movement of the magnet structure assembly in the one or in the other direction from the neutral position for closing the one or the other of said two switches, and means responsive to the movement of a directional relay to a motor interrupting position to complete the plugging circuit, said preset switch device being effective upon the stopping of the motor to interrupt said plugging circuit, and inertia means for preventing overtravel of the magnet structure assembly upon its return to the neutral position upon the stopping of the rotation of the motor, and inertia means for limiting the movement of the magnet structure to prevent overtravel of the magnet structure upon its return to the neutral position upon the stopping of the rotation of the disk.

3. A directional switch device comprising a horizontally positioned shaft operable in either of two directions of rotation, a switch supporting frame, two pairs of switch contact members mounted on the switch supporting frame, a vertically positioned disk of electrically conducting material operably connected to rotate in the one or in the other direction in accordance with the rotation of said shaft, a magnet structure assembly pivotally mounted above the disk for movement in the one or the other direction from a neutral position and having magnetic poles on opposite sides of the disk for movement by magnetic attraction in accordance with the direction of rotation of the disk, means operable upon movement of the magnet structure assembly in the one or in the other direction from the neutral position for closing the one or the other of said pairs of switch contact members and for retaining the contact members closed so long as the shaft continues to rotate in the given direction, an inertia stop mechanism comprising a weight pivotally mounted on said switch supporting frame and an inertia stop arm extending from said magnet structure assembly and arranged to engage said weight upon movement of said magnet assembly to its neutral position from either of its switch closing positions for limiting the movement of the magnet structure assembly to prevent overtravel.

4. A directional switch device comprising a shaft operable in either of two directions of rotation, two pairs of switch contact members, a disk of electrically conducting material operably connected to rotate in the one or the other direction in accordance with the rotation of said shaft, a magnet structure assembly mounted for movement in the one or the other direction from a neutral position and having magnetic poles on opposite sides of the disk for movement by magnetic attraction in accordance with the direction of rotation of the disk, means operable upon movement of the magnet structure assembly in the one or the other direction from the neutral position for closing the one or the other of said pairs of switch contact members and for retaining the contact members closed upon continuous rotation of the disk in the given direction, and an inertia stop mechanism comprising a weight pivotally attached to said switch supporting frame and an inertia stop arm extending from said magnet structure assembly to its neutral position from either of its switch closing positions for limiting the movement of the magnet structure assembly to prevent overtravel thereof.

5. In a motor driven electrical apparatus, in combination, a motor, a pair of directional relays for controlling the operation of the motor in the one or the other direction of rotation, a preset motor plugging switch device comprising a disk of electrically conducting material operably connected to rotate in the one or in the other direction in accordance with rotation of said motor, a magnet structure assembly mounted for movement in the one or in the other direction from a neutral position and having magnetic poles on opposite sides of the disk for movement by magnetic attraction in accordance with the direction of rotation of the disk, said magnet structure being so positioned as to be normally biased by gravity to a neutral position, said preset motor plugging switch device including two switches responsive to the movement of the magnet structure assembly in the one or in the other direction from the neutral position for closing the one or the other of said two switches and for retaining the switch closed so long as the disk continues to rotate in the given direction, inertia means for limiting the movement of the magnet structure to prevent overtravel of the magnet structure upon its return to the neutral position upon the stopping of the rotation of the disk, and means responsive to the movement of a directional relay to a motor interrupting position to complete the plugging circuit.

6. A directional switch device comprising a horizontally positioned shaft operable in either of two directions of rotation, a switch supporting frame, two pairs of switch contact members mounted on the switch supporting frame, a vertically positioned disk of electrically conducting material operably connected to rotate in the one or in the other direction of rotation in accordance with the rotation of said shaft, a switch operating structure pivotally mounted above the disk for movement in the one or the other direction from a neutral position and comprising a magnet structure assembly having magnetic poles on opposite sides of the disk for movement by magnetic attraction in accordance with the direction of rotation of the disk, a magnet supporting frame for carrying the magnet structure assembly, means for pivotally mounting the magnet supporting frame on the switch supporting frame, switch contact operating arms attached to the magnet supporting frame for operating the one or the other of said pairs of switch contact members to a circuit closing position upon movement of the switch operating structure from a neutral position in the one or the other direction, an inertia stop arm attached to the magnet supporting frame, and an inertia stop member comprising a weight pivotally attached to said switch supporting frame and arranged to be engaged by the inertia stop arm upon movement of the switch operating structure to its neutral position from either of its switch closing positions for limiting the movement of the switch operating structure from a switch closing position to prevent overtravel thereof.

7. A directional switch device comprising a shaft operable in either of two directions of rotation, a switch supporting frame, two pairs of switch contact members mounted on the switch supporting frame, a disk of electrically conducting material operably attached to rotate in the one or in the other direction of rotation in accordance with the rotation of said shaft, a switch operating structure mounted for movement in the one or in the other direction from a neutral position and comprising a magnet structure having magnetic poles on opposite sides of the disk for movement by magnetic attraction in accordance with the direction of rotation of the disk, a magnet supporting frame for carrying the magnet structure, means for mounting the magnet supporting frame on the switch supporting frame, switch contact operating arms attached to the magnet supporting frame for operating the one or the other of said pairs of switch contact members to a circuit closing position upon movement of the switch operating structure from a neutral position in the one or the other direction and an inertia stop arm attached to the magnet supporting frame, and an inertia stop member comprising a weight pivotally mounted on said switch supporting frame and positioned to be engaged by the inertia stop arm upon movement of the switch operating structure to its neutral position from either of its switch closing positions for limiting the movement of the switch operating structure to prevent overtravel thereof.

CLINTON L. DENAULT.

REFERENCES CITED

The following references are of record in the file of this patent:

UNITED STATES PATENTS

| Number | Name | Date |
|---|---|---|
| 1,161,932 | Du Bois | Nov. 30, 1915 |
| 1,222,720 | Bijur | Apr. 17, 1917 |
| 1,997,477 | Warnke | Apr. 9, 1935 |
| 2,125,055 | Taliaferro | July 26, 1938 |
| 2,141,278 | Owens | Dec. 27, 1938 |
| 2,165,079 | Tubbs | July 4, 1939 |
| 2,167,850 | Phillips | Aug. 1, 1939 |
| 2,206,696 | Hall | July 2, 1940 |
| 2,209,368 | Whittaker | July 30, 1940 |

FOREIGN PATENTS

| Number | Country | Date |
|---|---|---|
| 107,144 | Australia | Apr. 20, 1939 |